United States Patent [19]
Kalibjian

[11] Patent Number: 5,903,393
[45] Date of Patent: May 11, 1999

[54] OPTICAL-HYBRID ETALONS FOR SIMULTANEOUS PHASE- AND POLARIZATION-DIVERSITY OPERATIONS

[76] Inventor: Ralph Kalibjian, 1051 Batavia Ave., Livermore, Calif. 94550-5516

[21] Appl. No.: 08/985,108

[22] Filed: Dec. 4, 1997

[51] Int. Cl.⁶ ................................................. G02B 27/10
[52] U.S. Cl. ...................... 359/618; 359/122; 359/189; 359/192; 359/629; 372/92; 385/49
[58] Field of Search .................... 359/618, 629, 359/639, 640, 326, 260, 189, 192, 122, 568; 372/92, 98, 99; 385/49

[56] References Cited

U.S. PATENT DOCUMENTS

| | | | |
|---|---|---|---|
| 4,823,357 | 4/1989 | Casey | 372/92 |
| 4,871,232 | 10/1989 | Grinberg et al. | 359/618 |
| 5,027,436 | 6/1991 | Delavaux | 359/189 |
| 5,054,884 | 10/1991 | Kubota | 359/629 |
| 5,060,312 | 10/1991 | Delavaux | 359/192 |
| 5,119,454 | 6/1992 | McMahon | 359/629 |

OTHER PUBLICATIONS

L.G. Kazovsky: "Phase– and polarization–diversity coherent optical techniques", J. of Lightwave Tech., vol. 7, No. 2, Feb. 1989, pp. 279–292.

L.G. Kazovsky, et al., "All–fiber 90°–optical hybrid for coherent communication", Applied Optics, vol. 26, No. 3, Feb. 1987, pp. 437–439.

R. Langenhorst, et al., "Balanced phase and polarization diversity coherent optical receiver", IEEE Photonics Tech Lett., vol. 3, No. 1, Jan. 1991, pp. 80–82.

E. Pennings, et. al., "Ultracompact all passive optical 90°–hybrid on InP using self–imaging", IEEE Photonics Tech Lett., vol. 5, No. 6, Jun. 1993, pp. 701–703.

R. Deri, et al., "Ultracompact monolithic integration of balanced polarization diversity photodetectors for coherent lightwave receivers", IEEE Photonics Tech. Lett., vol. 4, No. 11, Nov. 1992, pp. 1238–1240.

L.G. Kazovsky, "Balanced phase–locked loops for optical homodyne receivers performance analysis, design considerations, and laser linewidth requirements", J. of Lightwave Tech., vol. 4, No. 2, Feb. 1986, pp. 182–195.

E. Pennings, et al., "Ultra fabrication–tolerant fully packaged micro–optical polarization diversity hybrid", J. of Lightwave Tech., vol. 13, No. 10, Oct. 1995, pp. 1985–1991.

M.C. Wu, et. al., "Integrated devices make an optical bench on a chip", Laser Focus World, Feb. 1996, pp. 64–68.

Primary Examiner—Loha Ben

[57] ABSTRACT

Simultaneaous phase- and polarization-diversity in a coherent receiver are provided from a single-unit 90°-hybrid (as shown in the upper section of FIG. 2) by combining the polarization angle and the phase angle of the input lightwave signal into an effective phase angle in the hybrid output. Thus, the number of components in the receiver is reduced as compared to conventional systems, thereby simplifying the processing network operations in the coherent detection system. The hybrid is implemented by the use of a quarter-waveplate (QWP)/etalon 30 in conjunction with an input QWP 32. The linearly polarized signal beam transmitting through the QWP 32 (of variable polarization angle) is incident to the 2-face 14 of the QWP/etalon 30. The linearly-polarized local-oscillator beam 18 is incident on the 1-face 12, and is aligned co-directionally to the reflected beamlets 20 of the signal beam 28. The proper orientation of the waveplates 30 and 32 and the proper selection of the etalon phase angle are key elements in providing simultaneous phase- and polarization-diversity in the single-unit 90°-hybrid. A detector processing network module converts the four output beams $P_1$, $\tfrac{1}{2}P_2$, $\tfrac{1}{2}P_{2x}$, and $\tfrac{1}{2}P_{2y}$ into balanced electrical signals and combines the signals into quadrature outputs that are squared and summed, thereby producing an electrical output signal that is independent of both phase and polarization fluctuations of the input signal beam 16.

11 Claims, 6 Drawing Sheets

OPTICAL-HYBRID ETALONS FOR SIMULTANEOUS PHASE- AND POLARIZATION-DIVERSITY OPERATIONS

BACKGROUND—FIELD OF INVENTION

The present invention is in the field of optical hybrids for providing simultaneous phase- and polarization-diversity in coherent receivers and interferometric sensor systems.

BACKGROUND—DISCUSSION OF PRIOR ART

Hybrids are used in the optical spectrum to minimize both phase noise and polarization noise in coherent receivers and in interferometric sensors. A hybrid is a multiport device in which two input signals are mixed to produce output signals with prescribed phase-shifts from two or more output ports. For example, a 90°-hybrid generates quadraturely-phased mixed signals which can be appropriately processed to make the receiver response independent of either phase fluctuations or polarization fluctuations.

An excellent overview of hybrids for diversity receivers is given in reference [1]. Examples of single unit 90°-hybrids of the two-branch type using fiber couplers are given in reference [2] for polarization diversity operation, and in reference [3] for phase diversity. In reference [2] a phase controller is required to maintain the proper phase difference between the signal lightwave beam and the local oscillator (LO) lightwave beam, whereas, in reference [3] polarization controllers are required to maintain identical polarization states in both beams. As pointed out in reference [1] a polarization-diversity hybrid can also provide for phase-diversity in a lowpass-filtered heterodyne receiver, but not in a homodyne receiver because lowpass filtering cannot recover the signal for an intermediate frequency less than the signal bandwidth.

With the aim to provide both phase- and polarization-diversity in coherent receivers, a two channel 90°-hybrid system can be devised using an ensemble of fiber-couplers as described, for example, in reference [4]. A similar system using bulk-optics instead (without the use of fiber couplers) is described in reference [5]. Both systems have balanced four-branch outputs which allow for the cancellation of the LO laser intensity-noise in balanced-pair photodiode detection systems. In reference [5] the hybrid splits a linearly polarized signal of variable polarization angle into two polarization-diversity channels. Each channel in turn produces balanced outputs for each of the orthogonally polarized light beams of the input signal (for a fixed linear polarization-state of the LO laser beam). The outputs from the 8-ports of both channels are detected with 4-pairs of balanced photodiodes which are electronically processed to provide for both phase- and polarization-diversity response in the coherent receiver.

Another type of hybrid is based on the concept of self-imaging in a multi-mode (MM) waveguide as described in reference [6]. This system differs from the previous two systems of reference [4] and [5] by splitting the orthogonal polarization components at the detector rather than in the hybrid. A single source input to the rectangular-shaped-core MM-guide produces four output signals with anti-phase and quadrature phase components. Similarly, a second input (appropriately spaced from the first input) also produces four signals emerging from the same output ports of the first input. For a LO beam with a polarization plane of 45° with respect to the rectangular core of the guide and a linearly polarized input signal beam with a variable polarization angle, the two lightwave sources mix in the MM-guide producing four output beams that are balanced with each output beam having both orthogonal polarization states. The outputs are coupled to balanced pairs of photodiodes where the orthogonal polarization states are separated out by polarization-selective waveguides as described in reference [7]. Thus, for both phase- and polarization-diversity operations 2-banks of photodiode-pairs will be required for the two polarization states of the beams, or a total of 4-pairs of balanced photodiodes for the entire system (similar to the two previous systems). The penalty for the simpler hybrid of reference [6] is a more complicated detector system requiring polarization-selective waveguides coupling the hybrid output to the photodiodes.

The overall response from the hybrid/detector systems of references [4], [5], and [6] can be generalized and simplified in the following manner for a linearly polarized input signal. The outputs from the 2-pairs of balanced photodiodes in the first set are $B_1=a_oG\sin(\theta_S)\sin(\Phi)$, $B_2=a_oG\sin(\theta_S)\cos(\Phi)$ where $\sin(\theta_S)$ represents one orthogonal state of polarization; whereas, the second polarization state is represented by $\cos(\theta_S)$ in the second set with outputs $B_3=a_oG\cos(\theta_S)\sin(\Phi)$, $B_4=a_oG\cos(\theta_S)\cos(\Phi)$ where $\theta_S$ is the signal polarization angle, $\Phi$ is the phase difference between the signal lightwave and LO lightwave beams, $a_o$ is the throughput efficiency, $G=\sqrt{P_LP_S}$, and $P_L$ and $P_S$ are the LO and the signal beam power, respectively. In the first set the electrical signal output from the photodectector processing network is $F_1=B_1^2+B_2^2=a_oG^2\sin^2(\theta_S)$; whereas, in the second set the output is $F_2=B_3^2+B_4^2=a_oG^2\cos^2(\theta_S)$. Both $F_1$ and $F_2$ are independent of phase 4) but not independent of the polarization angle $\theta_S$. Polarization independence is achieved by summing $F_1$ and $F_2$, thus, $H=F_1+F_2=a_oG^2$ gives both phase- and polarization-diversity.

An objective in coherent receiver development is to provide for simultaneous phase- and polarization-diversity from a single-unit 90°-hybrid. This can be accomplished, for example, if the polarization angle and the phase angle of the input signal beam were combined together as an effective phase angle $(\Phi-\theta_S)$ of the hybrid output, then only 2-pairs of photodiodes would be required instead of the 4-pairs in the current systems. Thus, with a unified-hybrid the number of components in the receiver could be reduced and the processing network operations greatly simplified.

The 180°-hybrids in phase-locked-loop coherent receivers are described in reference [8]. The 180°-hybrids are simpler than the 90°-hybrids in that only two branches are required for a balanced system. The developmental goal for the 180°-hybrid is to compensate polarization fluctuations in the phase-locked loop by combining the signal polarization-angle into the overall phase of the hybrid output; thus, any polarization fluctuations could then be treated in the same manner as phase fluctuations in the feedback loop of the coherent receiver.

There are a number of hybrid-module packaging schemes depending on the type of hybrid construction based upon either fiberoptics, integrated-optics, or bulk-optics. According to reference [9] fiber-optic hybrids have low losses, but they also have problems in reliability and in polarization extinction ratios. Integrated-optic hybrids have problems in critical guide dimensions, propagation loss and reflection in the guides, and temperature-stability in single-mode guides. On the otherhand, bulk-optic hybrids offer advantages in low-loss, low-reflection, and excellent polarization-extinction ratios, but have disadvantages in packaging for a miniaturized-sized hybrid. Modular packaging techniques are described in reference [9] for reducing the size of a hybrid module. Gradient-index lenses (or rod lenses) are used for coupling light in and out of the module, as well as for equalizing the delay paths of the several beams in the module by appropriate adjustment of the rod-lens length. Assembly tolerances can be reduced by maintaining all beams parallel to one another within the module. Further hybrid-miniaturization developments with truly micro-optical components could be based on the emerging fabrication technology of building a free-space micro-optical bench on a silicon chip as described in reference [10].

REFERENCES

[1] L. G. Kazovsky: "Phase- and polarization-diversity coherent optical techniques", Journal of Lightwave Technology, Vol. 7, No. 2, February 1989, pp. 279–292;

[2] J. P. Delavaux, U.S. Pat. No. 5,027,436, Jun. 25, 1991.

[3] L. G. Kazovsky, et al.: "All-fiber 90° optical hybrid for coherent communications", Applied Optics, Vol. 26, No. 3, February 1987, pp. 437–439;

[4] J. P. Delavaux, U.S. Pat. No. 5,060,312, Oct. 22, 1991.

[5] R. Langenhorst, et al.: "Balanced phase and polarization diversity coherent optical receiver", IEEE Photonics Technology Letters, Vol. 3, No. 1, January 1991, pp. 80–82;

[6] E. C. M. Pennings, et al.: "Ultracompact, all-passive optical 90°-hybrid on InP using self-imaging", IEEE Photonics Technology Letters, Vol. 5, No. 6, June 1993, pp. 701–703;

[7] R. J. Deri, et al.: "Ultracompact monolithic integration of balanced, polarization diversity photodetectors for coherent lightwave receivers", IEEE Photonics Technology Letters, Vol. 4, No. 11, November 1992, pp. 1238–1240;

[8] G. Kazovsky, "Balanced phase-locked loops for optical homodyne receivers: performance analysis, design considerations, and laser linewidth requirements", Journal of Lightwave Technology, Vol. 4, No. 2, February 1986, pp. 182–195;

[9] F. C. M. Pennings, et al.: "Ultra fabrication-tolerant fully packaged micro-optical polarization diversity hybrid", Journal of Lightwave Technology, Vol. 13, No. 10, October 1995, pp. 1985–1991;

[10] M. C. Wu, et al.: "Integrated devices make an optical bench on a chip", Laser Focus World, February 1996, pp. 64–68.

SUMMARY

In my invention for a single-unit 90°-hybrid both features of phase- and polarization-diversity in a coherent receiver are provided simultaneously by combining the polarization angle and the phase angle of the input lightwave signal into an effective phase angle ($\phi-\theta_S$) of the hybrid output. Thus, the number of components in the receiver is reduced, thereby simplifying the processing network operations in the coherent detection system. Similarly, in the 180°-hybrid output the polarization angle and the phase angle are combined into an effective phase angle ($\Phi-\theta_S$) which becomes the controlling factor in the feedback loop of the coherent receiver rather than the phase angle $\Phi$ alone as in conventional systems.

Accordingly, it is an object of my invention: 1) to unify both the polarization and phase diversity operations into a single unit device for the 90°-optical hybrid, and 2) to combine the polarization angle into the overall phase angle in the output of a single unit 180°-hybrid.

A primary object of my invention is to implement the 90°-hybrid with a quarter-waveplate (QWP)/etalon. The input signal beam (of variable polarization state and phase) transmits through an auxiliary QWP before irradiating the front-side of the QWP/etalon; whereas, the linearly-polarized LO laser beam irradiates the back-side of the QWP/etalon. The proper orientation of the waveplates and the proper selection of the etalon phase angle are key elements in providing for simultaneous phase- and polarization-diversity in the single-unit hybrid.

Another object of my invention is to provide balanced outputs from the 90°-hybrid for a specified reflection coefficient of the QWP/etalon.

It is yet another object of my invention to combine the polarization angle into the overall phase or effective phase angle of the 180°-hybrid output with a conventional etalon instead of the QWP/etalon. Balanced outputs are obtained from the 180°-hybrid for a reflection coefficient different than the QWP/etalon reflection coefficient.

It is still another object of my invention to implement a miniature hybrid module having reliable performance in a mechanically robust package.

Further objects and advantages of my invention will become apparent from a consideration of the drawings and the ensuing description.

DESCRIPTION OF THE PREFERRED EMBODIMENTS

Figure 1:
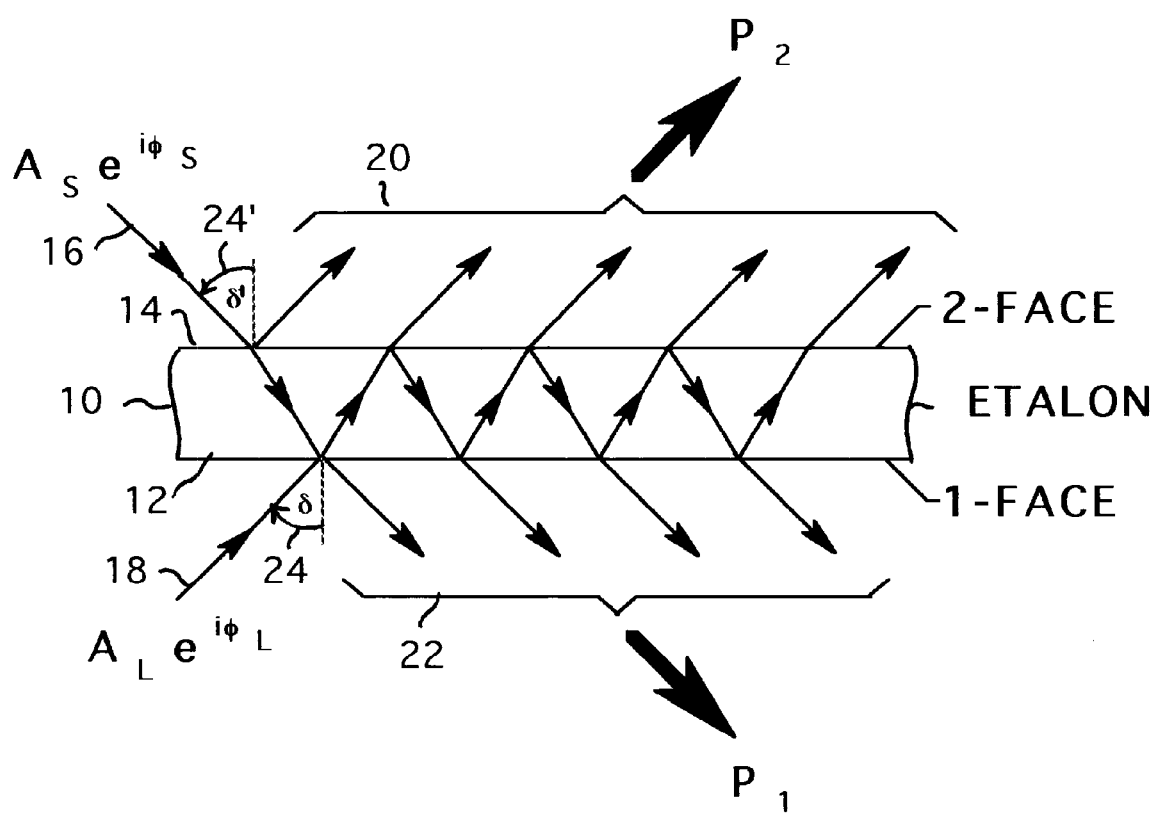
FIG. 1 shows the multiple light-beam paths inside an etalon for contra-directional incident beams on the etalon.

The basic component for the hybrid is a an etalon which mixes two contra-directional incident waves of the signal beam (with complex amplitude $A_S e^{i\phi_S}$) and the LO beam (with complex amplitude $A_L e^{i\phi_L}$) where $A_S=\sqrt{2P_S}$ and $A_L=\sqrt{2P_L}$, $P_S$ and $\phi_S$ are the received signal power and phase, and $P_L$ and $\phi_L$ are the LO power and phase, respectively, at the input ports. FIG. 1 shows an LO beam 18 incident to an etalon 10 at an angle δ 24 at the 1-face 12; similarly, the signal beam 16 is incident to the etalon 10 at the 2-face 14. The 1-face 12 and the 2-face 14 are partially-reflecting mirror surfaces of the etalon with reflection coefficient R. The LO beam 18 is aligned co-directionally to the reflected beamlets 20 of the signal beam 16 in the etalon 10, or alternatively the signal beam 16 could be aligned co-directionally to the reflected beamlets 22 of the LO beam by matching the incident beam angle δ' 24' at the 2-face 14 to δ 24 at the 1-face 12. The mixing of the signal beam 16 and the LO beam 18 in the etalon 10 results in output beams $P_2$ (the sum of beamlets 20) and $P_1$ (the sum of beamlets 22). The etalon phase angle is $$\Psi = \frac{4\pi nd}{\lambda}\cos(\delta_c) \tag{1}$$

where the beam angle $\delta_c$ inside the etalon is related to the external beam angle $\delta$ 24 by Snell's law $n\sin(\delta_c)=\sin(\delta)$, n is the etalon refractive index, d is the etalon thickness, and $\lambda$ is the free-space wavelength of the laser. A plot of $P_1$ or $P_2$ vs $\Psi$ (with either $A_S$ or $A_L$ blanked out) gives the well-known Airy function of maxima/minima resonance peaks of the multiple-beam interference fringes of the Fabry-Perot etalon. With both sources irradiating the etalon (assuming similar polarization states and equal power levels $P_S=P_L=P_O$) the output beam power from the etalon is $$P_1 = P_0 - \frac{4P_0(1-R)\sqrt{R}\sin\left(\frac{1}{2}\Psi\right)\sin(\Phi)}{(1-R)^2 + 4R\sin^2\left(\frac{1}{2}\Psi\right)} \tag{2}$$

where a plus sign for the second term of equation (2) gives the response for $P_2$, and $\Phi=(\phi_S-\phi_L)$.

Figure 2:
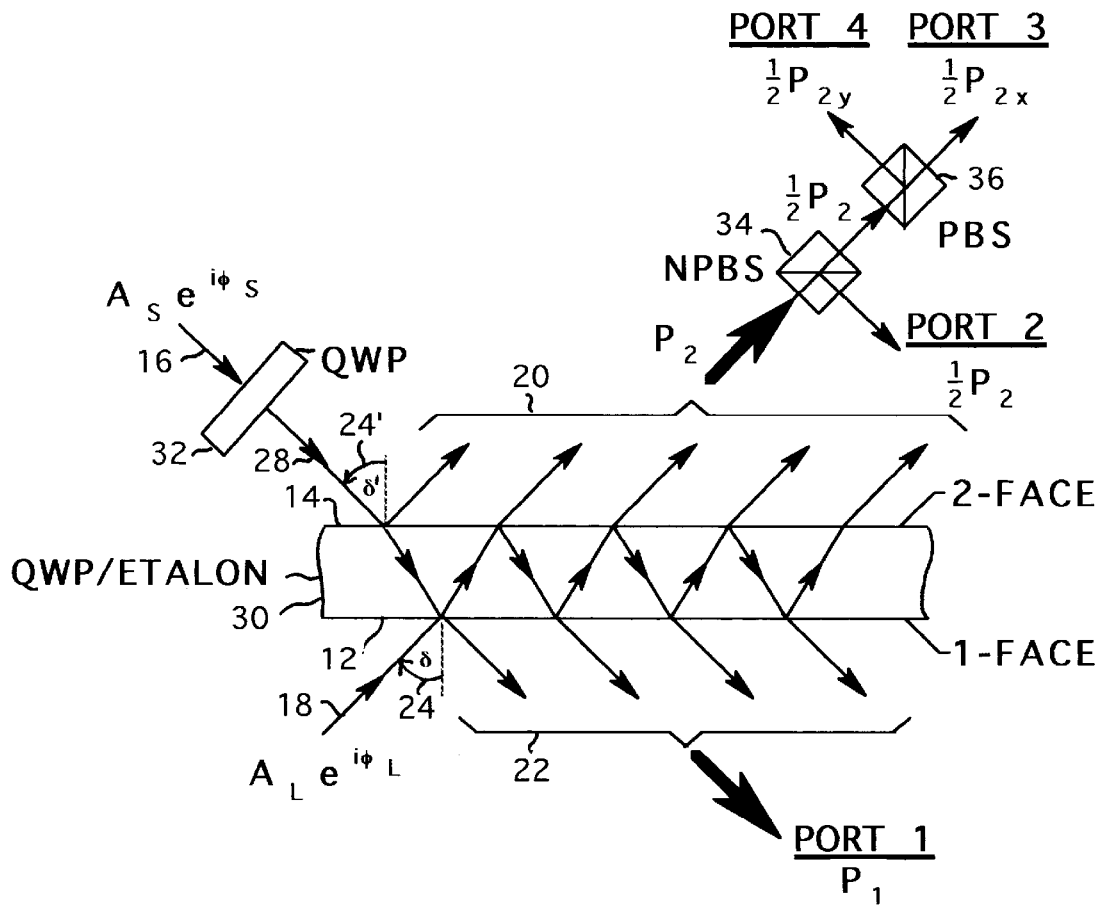
FIG. 2 shows the optical configuration of the 90°-hybrid and the polarization states of the various optical components in the hybrid.
Figure 2:
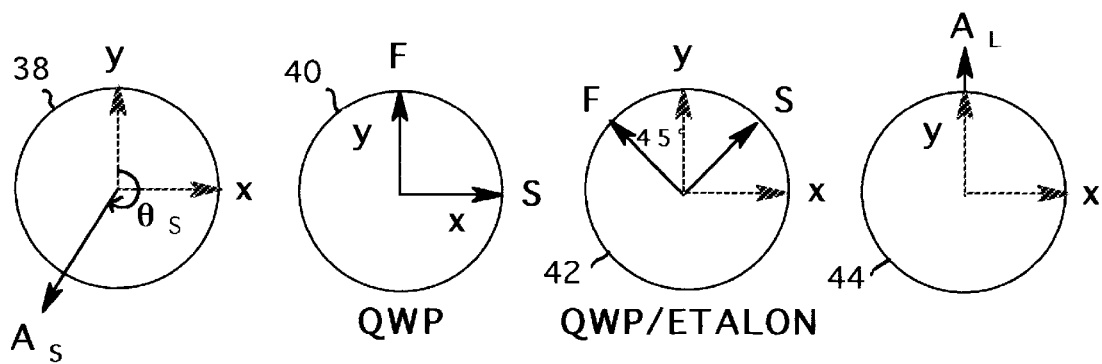

FIG. 2 shows the optical configuration for the 90°-hybrid which utilizes the basic etalon scheme of FIG. 1. The major components are a QWP 32 and a QWP/etalon 30 which is a quarter-waveplate used as an etalon (having partially-reflecting mirror surfaces 12 and 14 with reflection coefficient R). Phase and polarization diversity are obtained by appropriate orientation of the wave-plates and the proper selection of the etalon phase angle $\Psi$. The QWP fast (F) and slow (S) crystal axes are aligned parallel to the laboratory x-y coordinate system as shown in polar diagram 40; whereas, the QWP/etalon axes are oriented ±45° with respect to the x-y coordinate system as shown in polar diagram 42. The linearly polarized signal beam 16 at the input port (of variable polarization angle $\theta_S$ as shown in polar diagram 38) transmits through the QWP 32 to the 2-face of the QWP/etalon 30; whereas, the polarization plane of the LO beam 18 at the input port is parallel to one of the laboratory axes, in this case to the y-axis as shown in the polar diagram 44. The mixed output beams $P_2$ (beamlets 20) and $P_1$ (beamlets 22) are obtained for the condition of co-directionally aligned beamlets within the QWP/etalon 30 which occurs only for equal beam angles $\delta=\delta'$, 24 and 24'. A non-polarizing-beam-splitter (NPBS) 34 divides the $P_2$ beam into a reflected output beam $\frac{1}{2}P_2$ and a transmitted beam $\frac{1}{2}P_2$ which is further divided by a polarizing-beam-splitter PBS 36 (whose axes are aligned to the laboratory x-y coordinate system) with outputs $\frac{1}{2}P_{2x}$ and $\frac{1}{2}P_{2y}$. For an etalon phase angle $\Psi=(m-1)\pi$ (where $m=1, 2, 3, \ldots$) the output beams from the four output ports of the 90°-hybrid are $$P_1 = \frac{2P_L R + P_S(1+R^2) - 2\sqrt{R}(1-R)\sqrt{P_L P_S}\cos(\Phi-\theta_S)}{(1+R)^2} \tag{3}$$

$$\frac{1}{2}P_2 = \frac{P_L(1+R^2) + 2P_S R + 2\sqrt{R}(1-R)\sqrt{P_L P_S}\cos(\Phi-\theta_S)}{2(1+R)^2} \tag{4}$$

$$\frac{1}{2}P_{2x} = \frac{P_L(1+R^2) + 2P_S R + 2\sqrt{2RP_L P_S}\left[-R\sin\left(\Phi-\theta_S+\frac{\pi}{4}\right) + \cos\left(\Phi-\theta_S+\frac{\pi}{4}\right)\right]}{4(1+R)^2} \tag{5}$$

$$\frac{1}{2}P_{2y} = \frac{P_L(1+R^2) + 2P_S R + 2\sqrt{2RP_L P_S}\left[-\sin\left(\Phi-\theta_S+\frac{\pi}{4}\right) - R\cos\left(\Phi-\theta_S+\frac{\pi}{4}\right)\right]}{4(1+R)^2} \tag{6}$$

Figure 4A:
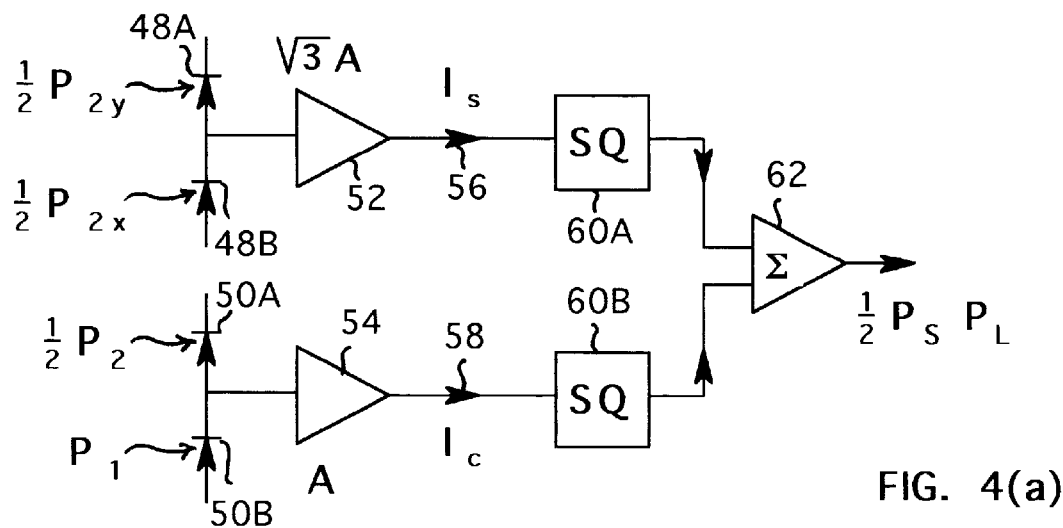
FIGS. 4(a), (b) and (c) show the schematics of the photodetector processing network for the 90°- and the 180°-hybrid.

The polarization angle $\theta_S$ is combined into the overall phase of the hybrid outputs in equations (3) to (6). Later in connection to FIG. 4 it will be shown that the detected outputs of equations (3) to (6) reduce to balanced responses for the special value of $R=2-\sqrt{3}=0.268$. The etalon phase angle can be controlled by the beam angle $\delta$ 24 according to equation (1). Experimentally, the following procedure is used to set $\Psi=(m-1)\pi$: 1) blank out the signal beam 16, 2) rotate the polarization angle of the LO beam 18 to either ±45° in the polar diagram 44, and 3) adjust the LO beam angle $\delta$ 24 for either a maximum or minimum response as monitored at either output port 3 or 4.

Figure 3:
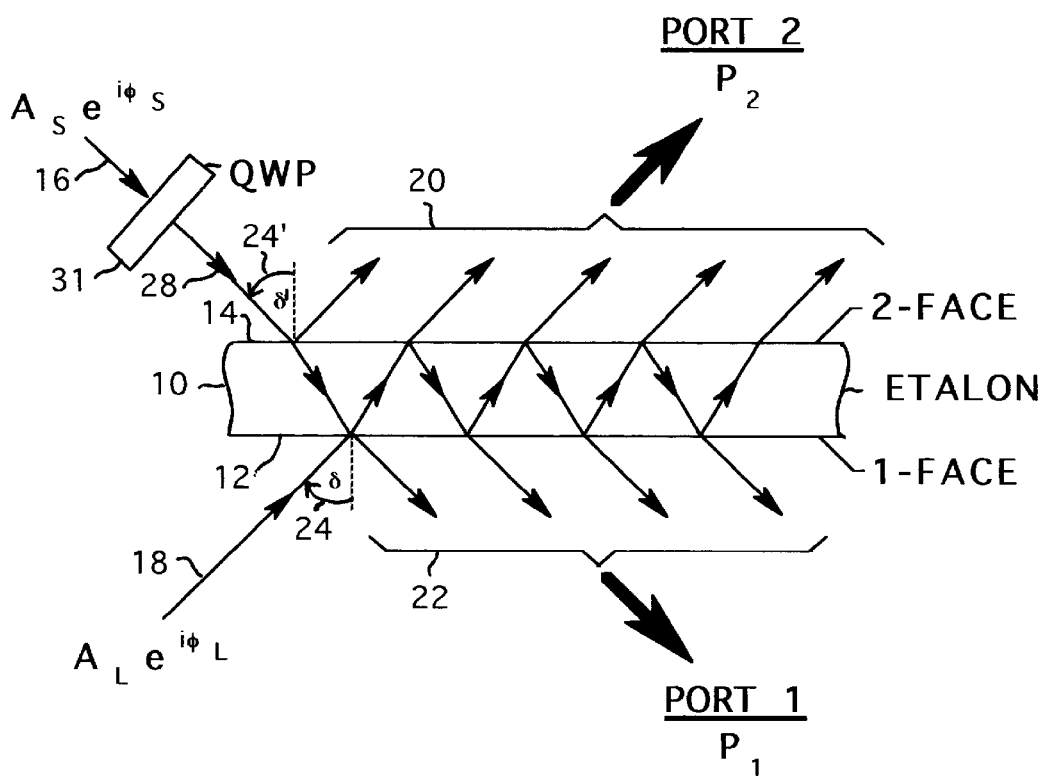
FIG. 3 shows the optical configuration of the 180°-hybrid and the polarization state of the LO beam with respect to the QWP.
Figure 3:
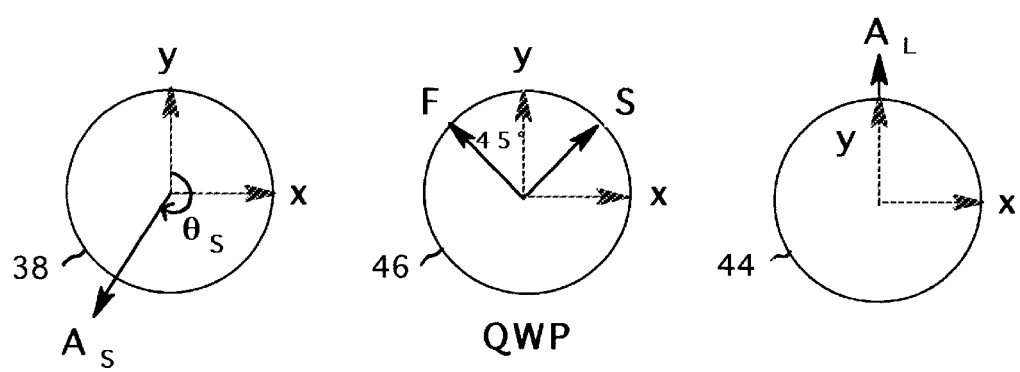

FIG. 3 shows the optical configuration for the 180°-hybrid which utilizes the basic etalon scheme of FIG. 1. The major components are a conventional etalon 10 (not a waveplate) with partially-reflecting mirror surfaces 12 and 14 of coefficient R and a QWP 31 whose crystal axes are oriented ±45° with respect to the laboratory x-y axes as shown in polar diagram 46. The linearly polarized signal beam 16 (of variable polarization angle as shown in polar diagram 38) transmits through the QWP 31 to the 2-face of the etalon 10. The linearly-polarized LO beam 18 at the input port can be oriented either to the x or to the y-axis as shown in polar diagram 44. In order to combine the polarization angle $\theta_S$ into the the overall phase of the hybrid output, the polarization plane of the LO beam 18 must bisect the crystal axes of QWP 31. The orientation with respect to the laboratory axes in the polar diagrams 44, 46 is only shown for illustrative purposes since any orientation angle is valid if the bisection condition is maintained. The mixed output beams $P_2$ (beamlets 20) and $P_1$ (beamlets 22) are obtained for co-directionally aligned beams within the etalon 30 which occur only for equal beam angles $\delta=\delta'$ 24 and 24'. For an etalon phase angle $\Psi=(2m-1)\pi$ the anti-phase output beams from the two output ports of the 180°-hybrid are $$P_1 = \frac{4RP_L + (1-R)^2 P_S - 2\sqrt{2R}(1-R)\sqrt{P_L P_S}}{(1+R)^2}\cos(\Phi-\theta_S) \tag{7}$$

$$P_2 = \frac{(1-R)^2 P_L + 4RP_S + (1-R)^2 P_S - 2\sqrt{2R}(1-R)\sqrt{P_L}}{(1+R)^2} \tag{8}$$

Experimentally, the etalon phase $\Psi=(2m-1)\pi$ is obtained by blanking out the signal beam 16 and adjusting the LO beam angle $\delta$ 24 for a minima response at the output port 2. As shown later in connection to FIG. 4, balanced response is obtained for $R=3-\sqrt{8}=0.172$ which makes the coefficients of the first two terms equal in equations (7) and (8), respectively.

FIG. 4(*a*) shows the schematic for the balanced photodetector processing network for the 90°-hybrid. By selecting an etalon reflection coefficient of $R=0.268$, the differential output from the balanced pair detector in each branch allows for the cancellation of the in-phase LO intensity-noise. The beam outputs from ports 3 and 4 of FIG. 2 are detected by a balanced pair of photodiodes 48A and 48B in the first branch and preamplified by 52; similarly, the beam outputs from ports 1 and 2 are detected in the second branch by a balanced pair of photodiodes 50A and 50B and preamplified by 54. The $\sqrt{3}$ excess gain in the first branch preamplifier 52 equalizes the interference component (the $\sqrt{P_S P_L}$ term) of the signal to the same level as that in the second branch. The electrical signal in the first branch is $I_S = \sqrt{3}\ rA(\frac{1}{2}P_{2y} - \frac{1}{2}P_{2x})$ 56, and in the second branch $I_c = rA(\frac{1}{2}P_2 - P_1)$ 58 where r is the detector responsivity and A is the amplifier gain. $I_S$ is equal only to the interference term, whereas in $I_c$ the $P_L$ term is made identically equal to zero by the selection of R=0.268. Thus, the balanced outputs of $I_S$ and $I_C$ from (3) to (6) for R=0.268 are given by $$I_S = \frac{1}{\sqrt{2}} rA \sqrt{P_L P_S} \sin(\Phi - \theta_S) \tag{9}$$

$$I_C = -\frac{1}{2} rAP_S + \frac{1}{\sqrt{2}} rA \sqrt{P_L P_S} \cos(\Phi - \theta_S) \tag{10}$$

$$I_C \approx \frac{1}{\sqrt{2}} rA \sqrt{P_L P_S} \cos(\Phi - \theta_S). \tag{11}$$

The first term in equation (10) can be ignored with respect to the second term (interference term) because $P_S \ll P_L$ which results in equation (11). Thus, in the pair of quadrature equations (9) and (11) the signal polarization angle $\theta_S$ appears as a component to the overall phase or effective phase angle of the periodic function. Both $I_S$ and $I_C$ are squared by 60A and 60B, and added in the summing amplifier 62 resulting in the output response $$I_Q = \frac{1}{2} r^2 A^2 P_L P_S \tag{12}$$

which is independent of both polarization and phase fluctuations.

For an elliptically polarized input signal the trigonometric function of the interference term in (9) and (11) is replaced by two terms. For example, $\sin(\Phi - \theta_S)$ is replaced by $[\cos(\Phi - \theta_S + \rho) - \epsilon \cos(\Phi - \theta_S)]/\sqrt{1 + \epsilon^2}$; thus, the response of (12) is modified by an additional multiplying factor $(1 - 2\epsilon \cos\rho + \epsilon^2)/(1 + \epsilon^2)$ where $\rho$ is the phase delay between the amplitudes of the major and minor axes of the ellipse, and $\epsilon$ is the ellipticity (the ratio of the amplitudes).

Figure 4B:
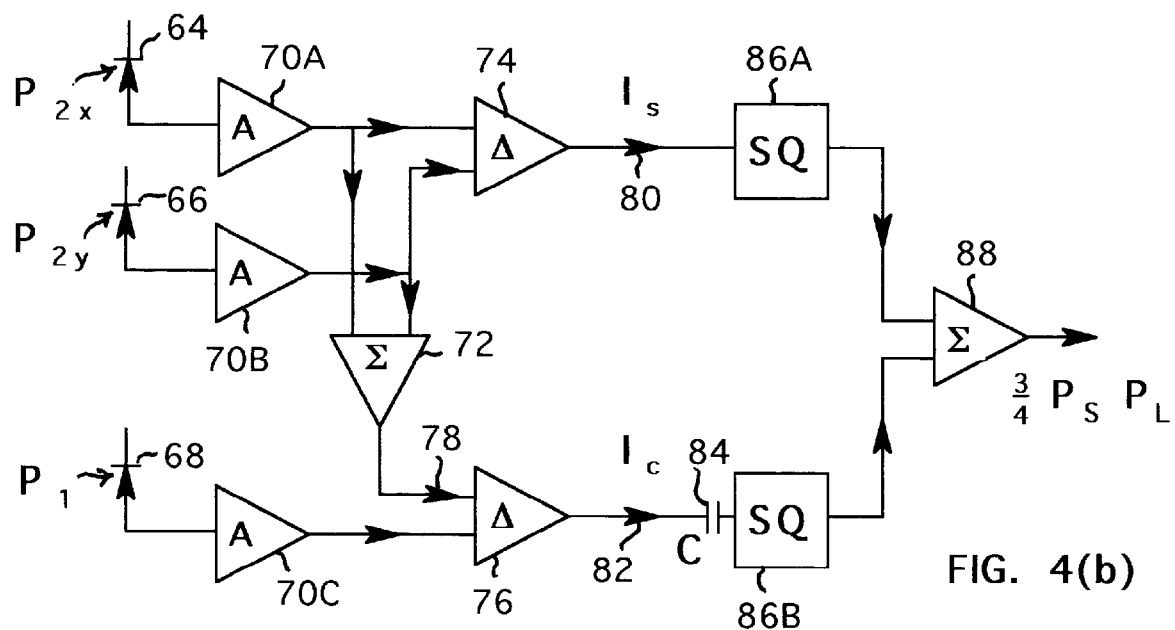

For those coherent detector systems not requiring balanced detection the throughput of the 90°-hybrid can be enhanced by 50% with the processing network shown in FIG. 4(b). By removing the NPBS 34 in FIG. 2, full-intensity signals $P_{2x}$ and $P_{2y}$ are provided to the input ports of the processing network in FIG. 4(b) which are detected by photodiodes 64 and 66, also, photodiode 68 detects the $P_1$ output. Low output impedance preamplifiers 70A, 70B, 70C of gain A are used in all three branches. The sum and difference of $P_{2x}$ and $P_{2y}$ are provided by a summing amplifier 72 and a differential amplifier 74 of unity gain. The inputs to the the differential amplifier 76 are $P_1$ and $(P_{2x} + P_{2y})$ 78 from the summing amplifier 72. The differential amplifier 74 provides the sine-term electrical signal $I_S$ 80, and the differential amplifier 76 provides the cosine-term electrical signal $I_C$ 82. The modulus of the interference terms are equalized by selecting an etalon reflection coefficient of R=0.333 which results in the branch response signals $$I_{su} = \frac{\sqrt{3}}{2} rA \sqrt{P_L P_S} \sin(\Phi - \theta_S) \tag{13}$$

$$I_{cu} = \frac{1}{4} rAP_L - \frac{1}{4} rAP_S + \frac{\sqrt{3}}{2} rA \sqrt{P_L P_S} \cos(\Phi - \theta_S). \tag{14}$$

In the unbalanced branch a capacitor C 84 blocks out the dc terms in $I_C$ 82, whereas $I_S$ 80 is equal only to the interference term. The squared functions from the squaring circuits of 86A and 86B are added in a summing amplifier 88. The resulting output is $$I_U = \frac{3}{4} r^2 A^2 P_L P_S \tag{15}$$

which has a 50% higher throughput than the balanced case of equation (12); however, this network could incur the penalty of a noisy LO beam in some applications.

Figure 4C:
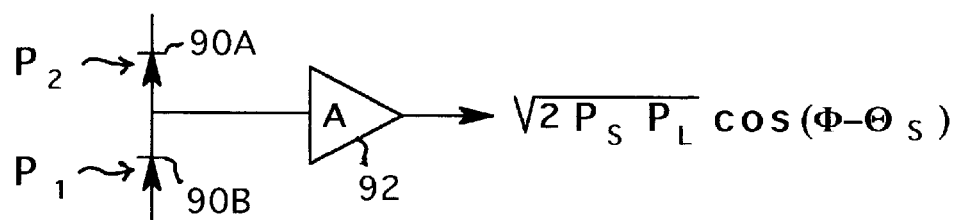

FIG. 4(c) shows the schematic for the photodetector processing network for the 180°-hybrid. By selecting an etalon reflection coefficient R=0.172, a balanced pair of photodiodes 90A and 90B cancels the in-phase LO laser intensity-noise from the input signals of ports 1 and 2 of FIG. 3. For an etalon reflection coefficient of R=0.172, the balanced electrical signal from preamplifier 92 is $$I_H = rA \sqrt{2 P_L P_S} \cos(\Phi - \theta_S) \tag{16}$$

where the signal polarization angle $\theta_S$ is combined into the overall phase or effective phase angle of the cosine function. Thus, for phase-locked loop applications polarization fluctuations in the signal appear as fluctuations in the phase output of the 180°-hybrid.

Figure 5:
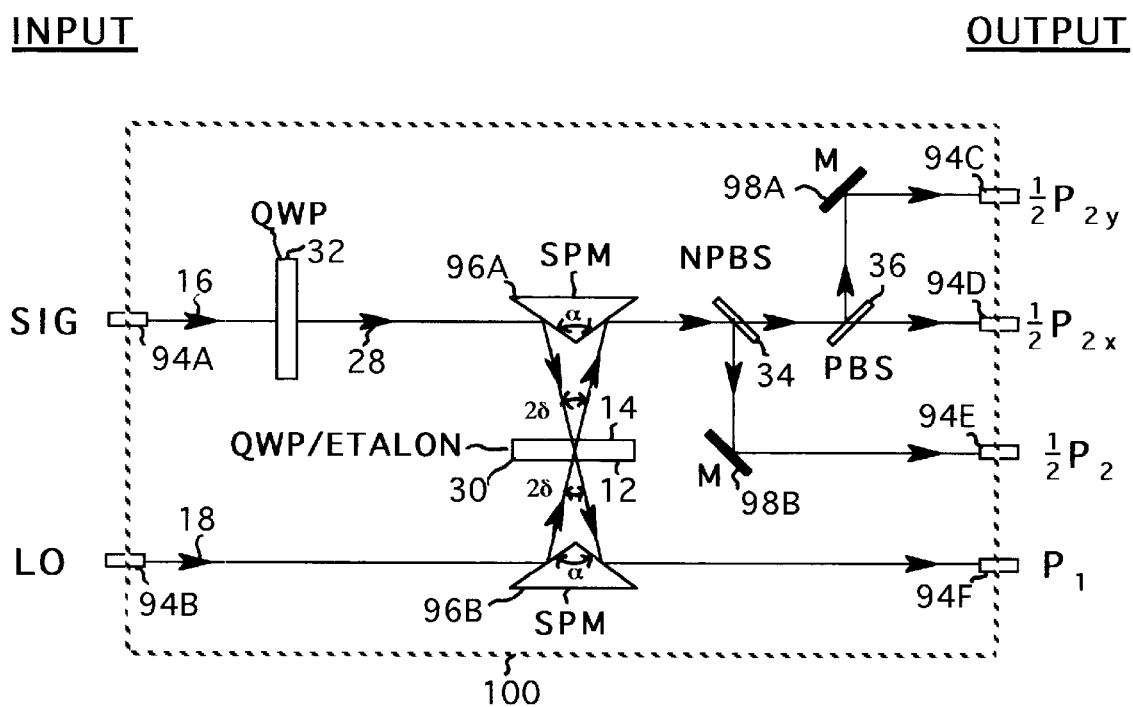
FIG. 5 shows the diagram for a miniaturized hybrid module.

FIG. 5 shows a configuration that can be miniaturized for a hybrid-module 100, for example, the 90°-hybrid of FIG. 2. All optical components (sized to be less than 1-cm) are linked with short beam paths between components. The input ports and the output ports are located on opposite sides of the module package. Gradient-index lenses (or rod lenses) 94A, 94B, 94C, 94D, 94E, and 94F are used to couple light in and out of the module 100. The linearly polarized signal beam 16 is incident to the QWP 32 resulting in a transmitted beam 28 of variable polarization state. The signal beam 28 and the LO beam 18 have parallel beam paths and each is incident to a splitting-mirror (SPM) 96A and 96B, respectively, in the immediate region of the etalon 30. The planar reflective surfaces 12 and 14 of the QWP/etalon 30 and the base of the SPM 96A and 96B are parallel to the beams 18 and 28. For a vertex angle $\alpha = (90° + \delta)$ the SPM 96A (96B) steers the beam 18 (28) to a $\delta$-angle of incidence to the QWP/etalon 30. The output beams in turn are steered at the opposite face of the SPM 96A, 96B which maintain parallel output beams in alignment to the input beams. In the first branch NPBS 34, PBS 36, and mirrors 98A and 98B are used to split and steer the output beams $\frac{1}{2}P_{2y}$, $\frac{1}{2}P_{2x}$, and $\frac{1}{2}P_2$. The $P_1$ output is obtained from the second branch. The rod lenses 94C, 94D, 94E, 94F could couple the output ports of the hybrid in direct proximity to photodiode pairs in the processing-network module of FIG. 4(a) which could be integrally packaged to the hybrid module 100.

Figure 6:
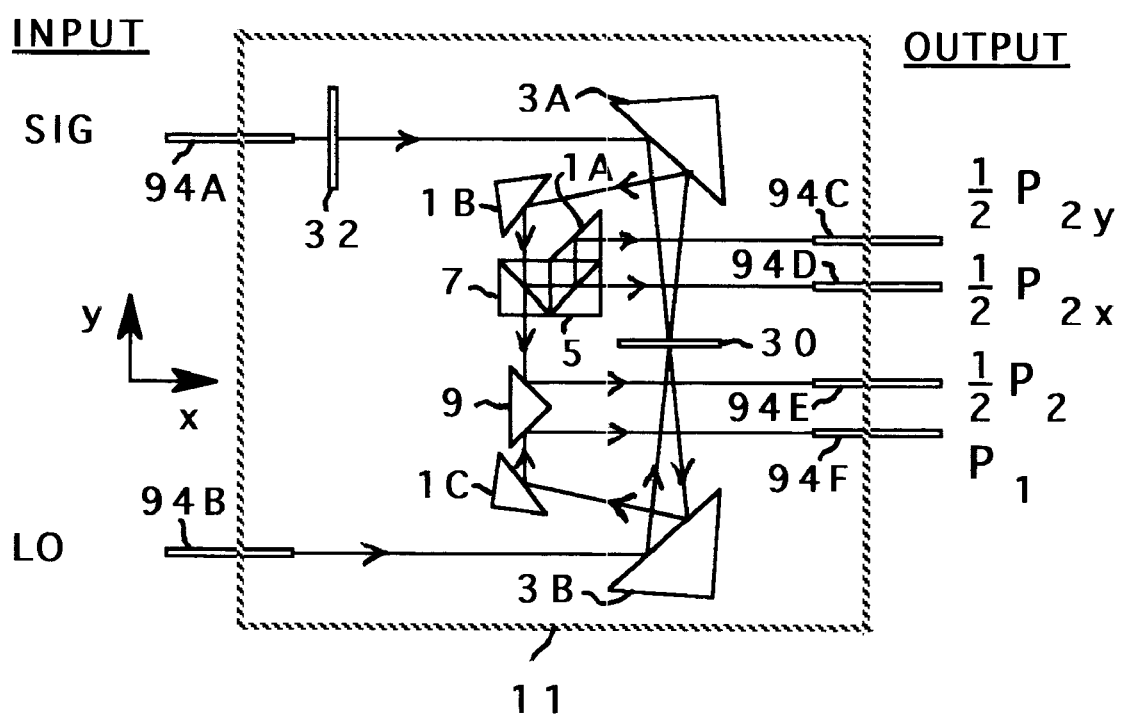
FIG. 6 shows the diagram for a miniaturized hybrid module with right angle prism mirrors.

Instead of using splitting mirrors 96A and 96B in FIG. 5, right angle prisms can be used as shown in FIG. 6. The hybrid module 11 of FIG. 6 with right angle prism reflectors 1A, 1B, 1C, 3A, 3B, and 9 have metallized surfaces to serve as mirrors for the incoming incident beams. The gradient index lenses 94A, 94B, 94C, 94D, 94E, 94F, and QWP 32 have similar functions as in FIG. 5. The signal beam and the LO beam have parallel beam paths and each is incident to a prism pair 3A and 3B, respectively, which are tilted by $\delta/2$ (with respect to the x-y coordinate system of the module) which gives an included beam angle of $2\delta$ for the intersecting beams in the QWP/etalon 30. The output mixed beams from the QWP/etalon 30 are steered by the prism pair 3A and 3B into another set of prism pairs 1B and 1C that are tilted by $\delta$ in order to steer the reflected beams perpendicular to the input beams SIG and LO. The non-polarizing cube beamsplitter 7 splits the beam from prism 1B into orthogonal beam paths resulting in one output beam ½P$_2$ as redirected by the steering prism 9 which also redirects (at the opposite face of 9) the beam from prism 1C into the output beam P$_1$. The reflected beam from the beamsplitter 7 is directed into polarizing beamsplitter 5 which is further split into orthogonally polarized beams ½P$_{2x}$ and ½P$_{2y}$ as redirected by the steering prism 1A. The components 1A, 5, and 9 can be bonded into one ensemble unit for ease of handling.

In the hybrid module a thin etalon is used in order to relax the assembly tolerance. For example, in a 0.1-mm thick quartz etalon at 1550-nm, the angular separation between the first and second mode of the transmission peaks is about 5°. Further reduction in the etalon thickness will increase the angular separation of the peaks and thereby ease the angular tolerance of the optical components assembled in the miniature optical baseboard of the modules in FIGS. 5 and 6. The hybrid baseboard could instead be a silicon wafer with grooves (cut by a dicing saw) to accomodate the optical components of the hybrid. The silicon wafer allows the option to utilize silica waveguides instead of the air-line beams such as single-mode guide inputs to the QWP/etalon and multi-mode guide outputs from the QWP/etalon. Further miniaturization of the hybrid module could be made in the future by utilizing the emerging micro-mechanics technology for the fabrication and assembly of micro-optical components on a silicon-chip platform.

In summary, the highlight of this invention is the use of an etalon as a hybrid which combines both the polarization angle and the phase angle into an effective phase angle $(\Phi-\theta_S)$ in the hybrid output. A 90° hybrid with a QWP/etalon provides for simultaneous phase- and polarization-diversity operation for linearly-polarized input signal and LO beams that are contra-directionally incident to the QWP/etalon. When a conventional etalon is substituted for the QWP/etalon, the polarization angle of the input signal is then combined into the overall phase of a 180°-hybrid output. As far as I have been able to determine from my search in technical journals and patents, the concept of using an etalon (or a waveplate etalon) as a key component in a hybrid has not been reported in the unclassified literature. While my above description contains many specifications, these should not be construed as limitations on the scope of the invention, but rather as an exemplification of several preferred embodiments thereof.

I claim:

1. A method for combining both polarization angle and phase angle of lightwave beams for producing an effective phase angle in mixed output lightwave beams from an etalon, comprising the steps of:

(a) receiving a linearly polarized first input lightwave beam and receiving a second input lightwave beam wherein said second input beam transmits through an input quarter-waveplate;

(b) irradiating an etalon with contra-directionally incident beams whereby said first input beam is incident to first face of said etalon and said second input beam transmitted through said input quarter-waveplate is incident to second face of said etalon;

(c) providing an etalon reflection coefficient R;

(d) adjusting beam angle for an optimum etalon phase angle Ψ by beam steering means; and (f) generating a first output lightwave beam P$_1$ from said first face of said etalon and a second output lightwave beam P$_2$ from said second face of said etalon by beam mixing means with said output beams P$_1$ and P$_2$ having an effective phase angle $(\Phi-\theta_S)$ where $\Phi$ is a difference phase angle between said first and second input beams and $\theta_S$ is a polarization angle of said second input beam whereby said polarization angle and said difference phase angle are combined in said effective phase angle for said output lightwave beams.

2. The method of claim 1, wherein a detector processing network means converts said beam P$_1$ and additional beams split from said beam P$_2$ into electrical signals and combines said electrical signals into quadrature output signals having said effective phase angle $(\Phi-\theta_S)$ and further processes said quadrature output signals by squaring and summing thereby producing an electrical output signal independent of both polarization and phase fluctuations of said second input beam.

3. The method of claim 2, wherein:

(a) said etalon is a quarter-waveplate with crystal axes bisecting the crystal axes of said input quarter-waveplate and having substantially the value $\Psi=(m-1)\pi$ for said etalon phase angle;

(b) plane of polarization of said first input beam is parallel to either axis of said input quarter-waveplate;

(c) said additional beams comprising a reflected beam and a transmitted beam as produced from a nonpolarizing beamsplitter whereby one of the beams from said nonpolarizing beamsplitter is further split into two orthogonally polarized beams by a polarizing beamsplitter whose axes are parallel to the axes of said input quarter-waveplate; and (d) said etalon has substantially the value R=0.268 for said reflection coefficient thereby producing substantially balanced outputs in the detector processing network.

4. The method of claim 1, wherein a detector processing network means converts said output beams P$_1$ and P$_2$ from said etalon into anti-phase electrical signals and subtracts said electrical signals thereby producing an electrical output signal with said effective phase angle $(\Phi-\theta_S)$.

5. The method of claim 4, wherein (a) said etalon is a conventional etalon having substantially the value $W=(2m-1)\pi$ for said etalon phase angle;

(b) plane of polarization of said first input beam bisects crystal axes of said input quarter-waveplate; and (c) said etalon has substantially the value R=0.172 for said reflection coefficient thereby producing balanced outputs in the detector processing network.

6. An optical hybrid, comprising:

(a) an etalon with a reflection coefficient R having a first input port for receiving a linearly polarized first input lightwave beam and transmitting said first input beam to first face of said etalon and a second input port for receiving a second input lightwave beam and transmitting said second input beam to second face of said etalon through an input quarter-waveplate interposed between said second port and said second face of said etalon;

(b) beam steering means for providing an optimum etalon phase angle Ψ by adjusting beam angles of said first and second input beams incident to said etalon; and (c) beam mixing means for generating a first lightwave output beam P$_1$ from said first face of said etalon and a second lightwave output beam P$_2$ from said second face of said etalon with said output beams P$_1$ and P$_2$ having an effective phase angle $(\Psi-\theta_S)$ where $\Phi$ is a difference phase angle between said first and second input beams and $\theta_S$ is a polarization angle of said second input beam whereby polarization fluctuations of said second input beam appear as fluctuations in said effective phase angle of said output beams.

7. The optical hybrid of claim 6, wherein a detector processing network means converts said output beam $P_1$ and additional beams split from said output beam $P_2$ from said etalon into electrical signals and combines said electrical signals into quadrature output signals having said effective phase angle $(\Phi-\theta_S)$ and further processes said quadrature output signals by squaring and summing thereby producing an electrical output signal independent of both phase and polarization fluctuations whereby said hybrid performs as a 90°-hybrid having simultaneous phase and polarization diversity properties.

8. The optical hybrid of claim 7, wherein:
  (a) said etalon is a quarter-waveplate etalon with crystal axes of said etalon bisecting the crystal axes of said input quarter-waveplate and having substantially the value $\Psi=(m-1)\pi$ for said etalon phase angle;
  (b) said first input beam is a local oscillator LO beam and said second input beam is a received signal beam;
  (c) plane of polarization of said LO beam is parallel to either axis of said input quarter-waveplate;
  (d) said additional beams are split from said output beam $P_2$ by a nonpolarizing beamsplitter whereby one of the beams from said nonpolarizing beamsplitter is further split into two orthogonally polarized beams by a polarizing beamsplitter whose axes are parallel to the crystal axes of said input quarter-waveplate; and
  (e) said etalon has substantially the value R=0.268 for said reflection coefficient thereby producing substantially balanced outputs in said quadrature output signals from said 90°-hybrid.

9. The optical hybrid of claim 6, wherein a detector processing network means converts said output beams $P_1$ and $P_2$ from said etalon into anti-phase electrical signals and subtracts said electrical signals whereby said hybrid performs as a 180°-hybrid having an electrical output signal with said effective phase angle $(\Phi-\theta_S)$.

10. The optical hybrid of claim 9, wherein:
  (a) said etalon is a conventional etalon having substantially the value $\Psi=(2m-1)\pi$ for said etalon phase angle;
  (b) said first input beam is a local oscillator LO beam and said second input beam is a received signal beam;
  (c) plane of polarization of said LO beam bisects crystal axes of said input quarter-waveplate; and
  (d) said etalon has substantially the value R=0.172 for said reflection coefficient thereby producing balanced outputs in said anti-phase electrical signals from said 180°-hybrid.

11. The optical hybrid of claim 6, comprising:
  (a) means for assembling optical components of said hybrid into a hybrid module wherein said input and output beams are coupled in and out of said hybrid module; and
  (b) means for proximity coupling said output beams from said hybrid module to a detector processing network module.

* * * * *

UNITED STATES PATENT AND TRADEMARK OFFICE
CERTIFICATE OF CORRECTION

PATENT NO. : 5,903,393
DATED : May 11, 1999
INVENTOR(S) : RALPH KALIBJIAN

It is certified that error appears in the above-identified patent and that said Letters Patent is hereby corrected as shown below:

Col. 2, line 30, change "4)" to "--$\Phi$--";
Col. 3, line 35, before "G." insert "--L.--";
Col. 3, line 40, change "F." to "--E.--";
Col. 3, line 54, change "($\phi$-$\theta_S$)" to "--($\Phi$-$\theta_S$)--";
Col. 5, in Eq. (6), change "-sin($\Phi$-$\theta_S$+$\frac{\pi}{4}$)" to "-- sin($\Phi$-$\theta_S$+$\frac{\pi}{4}$) --";
Col. 6, Eq. (7), change "$P_1 = \frac{4RP_L+(1-R)^2P_S-2\sqrt{2R}(1-R)\sqrt{P_LP_S}}{(1+R)^2} \cos(\Phi-\theta_S)$" to
"-- $P_1 = \frac{4RP_L+(1-R)^2P_S-2\sqrt{2R}(1-R)\sqrt{P_LP_S}\cos(\Phi-\theta_S)}{(1+R)^2}$ --";
Col. 6, Eq. (8), change "$P_2 = \frac{(1-R)^2P_L+4RP_S+(1-R)^2P_S-2\sqrt{2R}(1-R)\sqrt{P_L}}{(1+R)^2}$" to
"-- $P_2 = \frac{(1-R)^2P_L+4RP_S+2\sqrt{2R}(1-R)\sqrt{P_LP_S}\cos(\Phi-\theta_S)}{(1+R)^2}$ --";
Col. 6, line 44, change "R=3-$\sqrt{8}$=0.172" to "-- R=3-$\sqrt{8}$=0.172 --";
Col. 7, Eq. (12), change "1/2r$^2$" to "-- $\frac{1}{2}r^2$ --";

UNITED STATES PATENT AND TRADEMARK OFFICE
CERTIFICATE OF CORRECTION

PATENT NO.   : 5,903,393
DATED        : May 11, 1999
INVENTOR(S)  : Ralph Kalibjian It is certified that error appears in the above-identified patent and that said Letters Patent is hereby corrected as shown below:

Col. 9, line 64, change "(f)" to "--(e)--";
Col. 10, line 42, change "Ψ" to "--Φ--"; and
Col. 10, line 66, change "(Ψ-θ$_S$)" to "--(Φ-θ$_S$)--".

Signed and Sealed this

Ninth Day of May, 2000

*Attest:*

Q. TODD DICKINSON

*Attesting Officer*     *Director of Patents and Trademarks*

UNITED STATES PATENT AND TRADEMARK OFFICE
CERTIFICATE OF CORRECTION

PATENT : 5,903,393
DATED : May 11, 1999
INVENTOR(S) : Ralph Kalibjian

It is certified that error appears in the above-identified patent and that said Letters Patent is hereby corrected as shown below:

Col. 2, line 30, change "4)" to "--Φ--";

Col. 3, line 35, before "G." insert "--L.--";

Col. 3, line 40, change "F." to "--E.--";

Col. 3, line 54, change "(φ-θ$_S$)" to "--(Φ-θ$_S$)--";

Col. 5, in Eq. (6), change "-sin(Φ-θ$_S$+$\frac{\pi}{4}$)" to "-- sin(Φ-θ$_S$+$\frac{\pi}{4}$) --";

Col. 6, Eq. (7), change "$P_1 = \frac{4RP_L+(1-R)^2P_S-2\sqrt{2}R(1-R)\sqrt{P_LP_S}}{(1+R)^2} \cos(\Phi-\theta_S)$" to "-- $P_1 = \frac{4RP_L+(1-R)^2P_S-2\sqrt{2}R(1-R)\sqrt{P_LP_S} \cos(\Phi-\theta_S)}{(1+R)^2}$ --";

Col. 6, Eq. (8), change
"$P_2 = \frac{(1-R)^2P_L+4RP_S+(1-R)^2P_S-2\sqrt{2}R(1-R)\sqrt{P_L}}{(1+R)^2}$" to "-- $P_2 = \frac{(1-R)^2P_L+4RP_S+2\sqrt{2}R(1-R)\sqrt{P_LP_S} \cos(\Phi-\theta_S)}{(1+R)^2}$ --";

Col. 6, line 44, change "R=3-√8=0.172" to "-- R=3-√8=0.172 --";

Col. 7, Eq. (12), change "1/2r$^2$" to "-- $\frac{1}{2}r^2$ --";

UNITED STATES PATENT AND TRADEMARK OFFICE
CERTIFICATE OF CORRECTION

PATENT : 5,903,393
DATED : May 11, 1999
INVENTOR(S) : Ralph Kalibjian

It is certified that error appears in the above-identified patent and that said Letters Patent is hereby corrected as shown below:

Col. 10, line 42, change "W" to "--$\Psi$--"; and

Col. 10, line 66, change "($\Psi$-$\theta_S$)" to "--($\Phi$-$\theta_S$)--".

This certificate supersedes Certificate of Correction issued May 9, 2000.

Signed and Sealed this

Twenty-fifth Day of July, 2000

Q. TODD DICKINSON

*Attest:*

*Attesting Officer*　　　　　*Director of Patents and Trademarks*